United States Patent
Kimhi et al.

(10) Patent No.: US 11,750,623 B2
(45) Date of Patent: Sep. 5, 2023

(54) SYSTEM AND METHOD FOR CONDUCTING A DETAILED COMPUTERIZED SURVEILLANCE IN A COMPUTERIZED ENVIRONMENT

(71) Applicant: ITsMine Ltd., Herzliya (IL)

(72) Inventors: Kfir Kimhi, Herzliya (IL); Ran Norman, Rishon LeTsiyon (IL); Guy Ben Mayor, Rishon LeTsiyon (IL)

(73) Assignee: ITSMINE LTD., Herzliya (IL)

( * ) Notice: Subject to any disclaimer, the term of this patent is extended or adjusted under 35 U.S.C. 154(b) by 986 days.

(21) Appl. No.: 16/120,951

(22) Filed: Sep. 4, 2018

(65) Prior Publication Data

US 2019/0075124 A1 Mar. 7, 2019

Related U.S. Application Data

(60) Provisional application No. 62/553,915, filed on Sep. 4, 2017.

(51) Int. Cl.
| | | |
|---|---|---|
| H04L 9/40 | (2022.01) | |
| G06F 8/61 | (2018.01) | |
| G06F 21/55 | (2013.01) | |
| G06F 21/56 | (2013.01) | |

(52) U.S. Cl.
CPC ............ *H04L 63/1416* (2013.01); *G06F 8/61* (2013.01); *G06F 8/62* (2013.01); *G06F 21/554* (2013.01); *G06F 21/568* (2013.01); *H04L 63/1441* (2013.01)

(58) Field of Classification Search
CPC ............ H04L 63/1416; H04L 63/1441; G06F 21/554; G06F 21/568; G06F 8/62; G06F 8/61
See application file for complete search history.

(56) References Cited

U.S. PATENT DOCUMENTS

| | | | |
|---|---|---|---|
| 7,010,807 B1 * | 3/2006 | Yanovsky ............. | G06F 21/567 726/1 |
| 7,565,382 B1 * | 7/2009 | Sobel ...................... | G06F 21/57 |
| 8,347,394 B1 * | 1/2013 | Lee ........................ | G06F 21/554 726/25 |
| 8,443,438 B1 * | 5/2013 | Sharir | |
| 8,527,982 B1 * | 9/2013 | Sapuntzakis .............. | G06F 8/61 717/176 |
| 8,601,583 B1 * | 12/2013 | Chandrasekhar ..... | G06F 21/562 726/24 |
| 8,978,151 B1 * | 3/2015 | Chamberlain ........ | G06F 21/554 726/26 |
| 9,092,615 B1 * | 7/2015 | Mao ........................ | G06F 21/51 |
| 9,306,962 B1 * | 4/2016 | Pinto ....................... | G06F 21/35 |
| 9,462,010 B1 * | 10/2016 | Stevenson ........... | H04L 63/0218 |
| 9,471,624 B1 * | 10/2016 | Patil ...................... | G06F 16/162 |
| 10,277,628 B1 * | 4/2019 | Jakobsson ............. | H04L 51/212 |

(Continued)

*Primary Examiner* — Aravind K Moorthy
(74) *Attorney, Agent, or Firm* — M&B IP Analysts, LLC

(57) ABSTRACT

A system and method for conducting a computerized surveillance in a computerized environment, including: initiating an installation of an agent on an endpoint device (EPD) in response to an indication of a potential malicious activity executed on the EPD; activating the agent to collect data on the EPD; based on the analysis of the collected data, selecting at least one mitigation action to be executed by the agent; and initiating an uninstallation of the agent from the EPD.

17 Claims, 2 Drawing Sheets

(56) References Cited

U.S. PATENT DOCUMENTS

| | | | | |
|---|---|---|---|---|
| 10,375,095 B1* | 8/2019 | Turcotte | H04L 63/1425 | |
| 10,698,672 B1* | 6/2020 | Benskin | G06F 8/62 | |
| 2003/0191911 A1* | 10/2003 | Kleinschnitz, Jr. | G06F 16/20 | 711/154 |
| 2006/0031940 A1* | 2/2006 | Rozman | G06F 21/53 | 726/27 |
| 2006/0080656 A1* | 4/2006 | Cain | G06F 8/65 | 717/174 |
| 2006/0218503 A1* | 9/2006 | Matthews | G06F 3/0482 | 715/779 |
| 2006/0259819 A1* | 11/2006 | Connor | G06F 21/10 | 714/38.14 |
| 2007/0006303 A1* | 1/2007 | Donnelly | H04L 63/1441 | 726/22 |
| 2007/0136417 A1* | 6/2007 | Kreiner | G06F 16/9577 | 709/203 |
| 2007/0143851 A1* | 6/2007 | Nicodemus | H04L 63/1433 | 726/4 |
| 2007/0271614 A1* | 11/2007 | Capalik | H04L 63/1441 | 726/13 |
| 2008/0016570 A1* | 1/2008 | Capalik | H04L 63/1408 | 726/23 |
| 2008/0109783 A1* | 5/2008 | Govindarajan | G06F 8/61 | 717/174 |
| 2012/0066759 A1* | 3/2012 | Chen | G06F 21/554 | 726/15 |
| 2014/0075559 A1* | 3/2014 | Yao | G06F 21/568 | 726/24 |
| 2014/0143853 A1* | 5/2014 | Onodera | H04L 63/10 | 726/14 |
| 2014/0344888 A1* | 11/2014 | Yun | H04L 63/20 | 726/1 |
| 2014/0344912 A1* | 11/2014 | Chapman, II | H04L 63/1416 | 726/11 |
| 2015/0207812 A1* | 7/2015 | Back | H04L 63/1441 | 726/23 |
| 2015/0355893 A1* | 12/2015 | Luk | G06F 8/62 | 717/178 |
| 2015/0365437 A1* | 12/2015 | Bell, Jr. | H04L 63/20 | 726/1 |
| 2015/0378763 A1* | 12/2015 | Hassine | G06F 11/3006 | 718/1 |
| 2016/0044058 A1* | 2/2016 | Schlauder | H04L 63/1433 | 726/25 |
| 2016/0191567 A1* | 6/2016 | Chahal | G06F 21/44 | 726/1 |
| 2016/0218949 A1* | 7/2016 | Dasgupta | G06F 11/3466 | |
| 2016/0224786 A1* | 8/2016 | Swidowski | H04L 63/1416 | |
| 2016/0241573 A1* | 8/2016 | Mixer | H04L 63/20 | |
| 2016/0267267 A1* | 9/2016 | Hu | H04W 12/128 | |
| 2016/0321036 A1* | 11/2016 | Schnepper | G06F 8/61 | |
| 2016/0344754 A1* | 11/2016 | Rayapeta | H04L 63/0227 | |
| 2016/0359915 A1* | 12/2016 | Gupta | H04L 43/04 | |
| 2017/0031674 A1* | 2/2017 | Hattori | G06F 11/3476 | |
| 2017/0068526 A1* | 3/2017 | Seigel | G06F 11/3409 | |
| 2017/0109189 A1* | 4/2017 | Swidowski | G06F 21/554 | |
| 2017/0118211 A1* | 4/2017 | Murthy | H04L 63/0876 | |
| 2017/0141991 A1* | 5/2017 | Godowski | H04L 67/1097 | |
| 2017/0155673 A1* | 6/2017 | Desai | H04L 63/1425 | |
| 2017/0235951 A1* | 8/2017 | Harrison | G06F 21/51 | 726/24 |
| 2017/0237760 A1* | 8/2017 | Holeman | H04L 43/026 | 726/22 |
| 2017/0244748 A1* | 8/2017 | Krause | H04L 63/1425 | |
| 2017/0250997 A1* | 8/2017 | Rostamabadi | H04L 63/1416 | |
| 2017/0262268 A1* | 9/2017 | Godowski | G06F 8/62 | |
| 2017/0295164 A1* | 10/2017 | Sakurai | H04L 63/0807 | |
| 2017/0302701 A1* | 10/2017 | Phanse | H04W 12/0802 | |
| 2017/0315901 A1* | 11/2017 | Wang | G06F 11/3664 | |
| 2017/0364681 A1* | 12/2017 | Roguine | G06F 21/566 | |
| 2018/0004375 A1* | 1/2018 | Friend | G06F 3/0484 | |
| 2018/0007081 A1* | 1/2018 | Friend | H04L 63/1441 | |
| 2018/0018458 A1* | 1/2018 | Schmugar | G06F 21/554 | |
| 2018/0096158 A1* | 4/2018 | Murphy | G06F 16/122 | |
| 2018/0189490 A1* | 7/2018 | Maciejak | G06F 21/566 | |
| 2018/0219883 A1* | 8/2018 | Li | H04L 63/1441 | |
| 2018/0276001 A1* | 9/2018 | Roszak | G06F 9/452 | |
| 2019/0012159 A1* | 1/2019 | Cabrera | G06F 8/62 | |
| 2019/0068626 A1* | 2/2019 | Compton | H04L 63/102 | |
| 2020/0067861 A1* | 2/2020 | Leddy | G06F 21/6245 | |

* cited by examiner

SYSTEM AND METHOD FOR CONDUCTING A DETAILED COMPUTERIZED SURVEILLANCE IN A COMPUTERIZED ENVIRONMENT

CROSS-REFERENCE TO RELATED APPLICATIONS

This application claims the benefit of U.S. Provisional Application No. 62/553,915, filed on Sep. 4, 2017, the contents of which are hereby incorporated by reference.

TECHNICAL FIELD

The present disclosure generally relates to cyber security, and more specifically to a technique for conducting computerized surveillance in a computerized environment.

BACKGROUND

Enterprises all over the world hold sensitive and confidential information related to their business, employees and their clients. The information is sometimes stored in simple folders in a computerized environment, such as an enterprise network. In some countries a data breach that occurs in an enterprise database, network, and the like may lead to a financial penalty. Moreover, the enterprise may be perceived as unsecure so as clients and partners may not want to cooperate with the unsecure enterprise.

Therefore, enterprises usually deploy systems to prevent data leakages and similar incidents. A common solution is a data leakage prevention (DLP) system also known as data loss prevention system. A DLP system typically detects potential data breaches and prevents them by monitoring, detecting and blocking sensitive beaches. In data leakage incidents, sensitive data is disclosed to unauthorized parties by either malicious intent or by an inadvertent mistake. Sensitive data includes private or enterprise information, intellectual property (IP), financial or patient information, credit-card data, and so on.

One disadvantage of the existing DLP systems to prevent data breaches, is that such systems require coordination with various business functions within the enterprise to adapt the DLP system as the enterprise policy. Another disadvantage of existing DLP systems is that such systems requires significant resources in order to maintain its functionality. In addition, the DLP systems usually interrupt the employees' daily work. Another disadvantage of the DLP systems is that the integration of these systems usually takes several months, which can expose the unprotected enterprise to data threats during this period.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for conducting a computerized surveillance in a computerized environment, including: initiating an installation of an agent on an endpoint device (EPD) in response to an indication of a potential malicious activity executed on the EPD; activating the agent to collect data on the EPD; based on the analysis of the collected data, selecting at least one mitigation action to be executed by the agent; and initiating an uninstallation of the agent from the EPD.

Certain embodiments disclosed herein also include a non-transitory computer readable medium having stored thereon instructions for causing a processing circuitry to execute a process for conducting a computerized surveillance in a computerized environment, including: initiating an installation of an agent on an endpoint device (EPD) in response to an indication of a potential malicious activity executed on the EPD; activating the agent to collect data on the EPD; based on the analysis of the collected data, selecting at least one mitigation action to be executed by the agent; and initiating an uninstallation of the agent from the EPD.

Certain embodiments disclosed herein also include a system for conducting a computerized surveillance in a computerized environment, including: an interface; a processing circuitry; a memory coupled to the processing circuitry, the memory contains therein instructions that when executed by the processing circuitry configure the system to: initiate an installation of an agent on an endpoint device (EPD) in response to an indication of a potential malicious activity executed on the EPD; activate the agent to collect data on the EPD; based on the analysis of the collected data, select at least one mitigation action to be executed by the agent; and initiate an uninstallation of the agent from the EPD.

BRIEF DESCRIPTION OF THE DRAWINGS

The subject matter that is regarded as the disclosure is particularly pointed out and distinctly claimed in the claims at the conclusion of the specification. The foregoing and other objects, features, and advantages of the disclosure will be apparent from the following detailed description taken in conjunction with the accompanying drawings.

DETAILED DESCRIPTION

Figure 1:
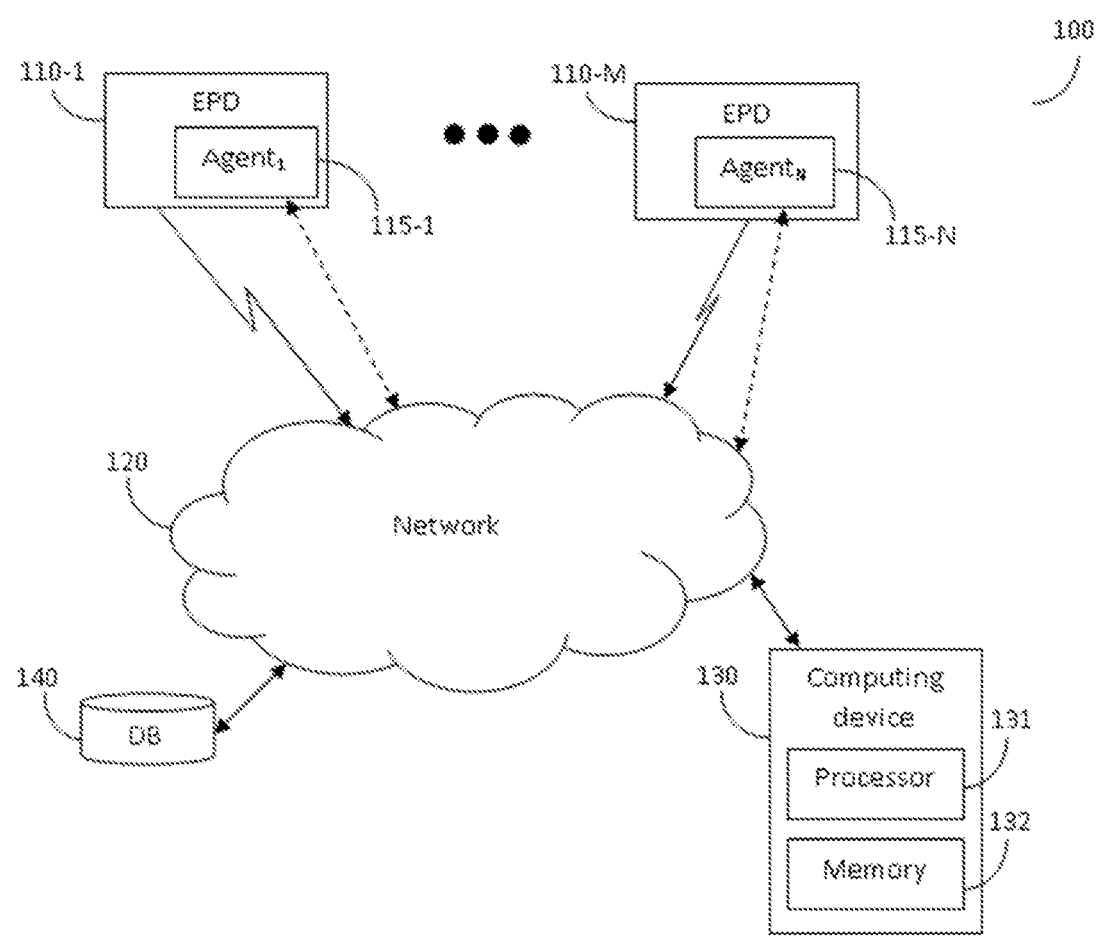
FIG. 1 is a network diagram utilized to describe various disclosed embodiments.

It is important to note that the embodiments disclosed by the disclosure are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

In an embodiment, a system is configured to receive an indication corresponding to potential malicious activity executed in a computerized environment using an end-point device (EPD). In response to receiving the indication, an agent is installed on the EPD for performing a specific task and thereafter, the agent is automatically removed. In one configuration, the agent enables the system to collect data corresponding to processes executed by the EPD, obtain evidences, create visual representation of the processes executed using the EPD, determine a threat level to the EPD, execute computerized actions, block the EPD from continuing to execute processes, and so on.

FIG. 1 depicts an example network diagram of a system 100 utilized to describe various disclosed embodiments. A network 120 is used to enable communication between the different components of the system 100. The network 120 may be, but is not limited to, a local area network (LAN), a wide area network (WAN), a metro area network (MAN), the world wide web (WWW), the Internet, a wired network, a wireless network, and the like, as well as any combination thereof.

A plurality of endpoint devices (EPD) 110-1 through 110-M, where M is an integer equal to or greater than 1, are communicatively connected to the network 120. The EPDs 110 can be, but are not limited to, smartphones, mobile phones, laptops, tablet computers, wearable computing devices, personal computers (PCs), a combination thereof and the like. The computerized environment may include a plurality of EPDs 110. A plurality of agents 115-1 through 115-N may be installed on the EPDs 110, where N is an integer equal to or greater than 1, and may be further connected to the network 120.

A computing device 130 is further connected to the network 120. The computing device 130 may be a computer hardware and software component configured to execute predetermined computing tasks. The computing device 130 comprises a processing circuitry 131 and a memory 132. The processing circuitry 131 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 132 may be a volatile memory such as, but not limited to, Random Access Memory (RAM). In an embodiment, the memory 132 is configured to store software for execution by the processing circuitry 131. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions cause the processing circuitry 131 to perform the various processes described herein and, in particular, configure the system to provide a transaction manager that acts in accordance with one or more of the disclosed embodiments.

According to an embodiment, the computing device 130 is configured to install an agent, such as the agent 115, on the EPD 110 in response to an indication of a potential malicious activity executed using the EPD 110. The potential malicious activity may be for example, triggering a deceptive decoy element that was initially deployed on the computerized environment, an attempt to make changes in files, folders, processes in the computerized environment, sharing files with an unauthorized entity, and so on.

In an embodiment, the indication of the potential malicious activity executed using the EPD 110 may include one or more triggering predetermined processes. The predetermined processes are conditions that cause the activation of the indication. The predetermined processes may include, for example, attempting to use a wrong password to log in to the EPD 110 more than three times, identifying a universal serial bus (USB) drive, and so on. In an embodiment, the indication may be received from a third-party application that runs in the network or on the endpoints 110, such as, firewall, anti-virus, mail security, etc. According to further embodiment, the potential malicious activity may be executed by, for example, employees of an enterprise, i.e., internal threat, external attackers, and so on.

The deceptive decoy element is at least a data element, such as a data file that is designed to simulate a regular data element, e.g., a legitimate data file. However, the deceptive decoy element does not include any confidential or necessary information. One or more deceptive decoy elements may be deployed on the computerized environment. For example, the one or more deceptive decoy elements may be deployed on the EPD 110, folders and/or files located on cloud databases, on email accounts, and so on. The utilization of the deceptive decoy elements is further discussed in U.S. patent application Ser. No. 16/017,267, assigned to the common assignee, the contents of which are hereby incorporated by reference.

The agent 115 is a software component configured to collect data corresponding to one or more processes executed using the EPD 110. According to one embodiment, the agent 115 may be configured to execute actions as further described herein below. According to further embodiment, the one or more agents 115 may be installed on one or more EPDs 110, i.e., the EPD 110-1 through EPD 110-M. As noted above, software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions cause the processing circuitry 131 to perform the various processes described herein and, in particular, configure the system to provide a transaction manager that acts in accordance with one or more of the disclosed embodiments.

Then, the computing device 130 is configured to activate collection of the data by the agent 115. The processes executed using the EPD 110 may be for example, sending emails that contains confidential content from the EPD 110, downloading certain files, sharing information with an unauthorized entity, etc. The collected data may be stored in a database 140.

The computing device 130 may be configured to execute a first set of computerized actions upon identification of a first set of data. The first set of data is at least a portion of the data collected by the agent 115. The first set of data may be indicative of, for example, a specific file that was shared with an unauthorized entity. The first set of computerized actions may include for example, blocking the EPD 110 from performing processes, obtaining evidences related to processes executed on the EPD 110, sending an educational message explaining the user the violation of the policy, and so on. In an embodiment, the agent 115 may be configured to execute the first set of computerized actions upon receiving a command from the computing device 130. The actions are mitigation actions. Examples of such mitigation actions include killing processes, shutting down an EPD 110, restarting an EPD 110, logging a user off an EPD 110, locking the EPD 110, deleting a Kerberos ticket, disabling drivers, disabling an internet connection, displaying messages, preventing files from being transferred/copied, and the like.

Then, the computing device 130 may be configured to uninstall the agent 115 after, for example, a predetermined time threshold was crossed, after a certain computerized action such as the first set of computerized actions was accomplished, etc. For example, after the agent 115 was installed on the EPD 110, the agent 115 is configured to collect data corresponding to processes executed using the EPD 110 and after a time period of 24 hours, the agent 115 is automatically uninstalled from the EDP 110. In an embodiment, the computing device 130 may initiate a count-down timer at the moment the agent 115 is installed on the EPD 110. Thus, when the count-down timer reaches a value of zero, the computing device 130 uninstalls the agent 115 from the EPD 110.

According to a further embodiment, the data collected by the agent 115 is analyzed and therefore allows for the determination of a threat level of the EPD 110. The threat level is a value that indicates the possibility that a user associated with a certain EPD will violate the policy of, for example, an enterprise. Violation of, for example, the enterprise policy may include for example, leaking data, stealing data, removing data, causing damages to data, etc. The determination of the threat level may be achieved by, for example, comparing the collected data to a set of predetermined rules stored in the database 140. According to another embodiment, the determination of the threat level may be achieved using machine learning techniques utilized for identifying attempts to execute unauthorized processes, trends occurring in the computerized environment, and so on.

For example, the collected data may indicate that a user associated with a first EPD 110-1 tried to open a certain file that the user does not have permission to open, and therefore the computing device 130 sends a notification to the first EPD 110-1. The notification may inform the user about the violation. According to the same example, for a two-week period after the notification was sent, the threat level of the first EPD 110-1 may be set to a medium threat level if no other violations are identified. After the two-week period, the threat level may be changed to a low threat level if no new threats have been detected.

Figure 2:
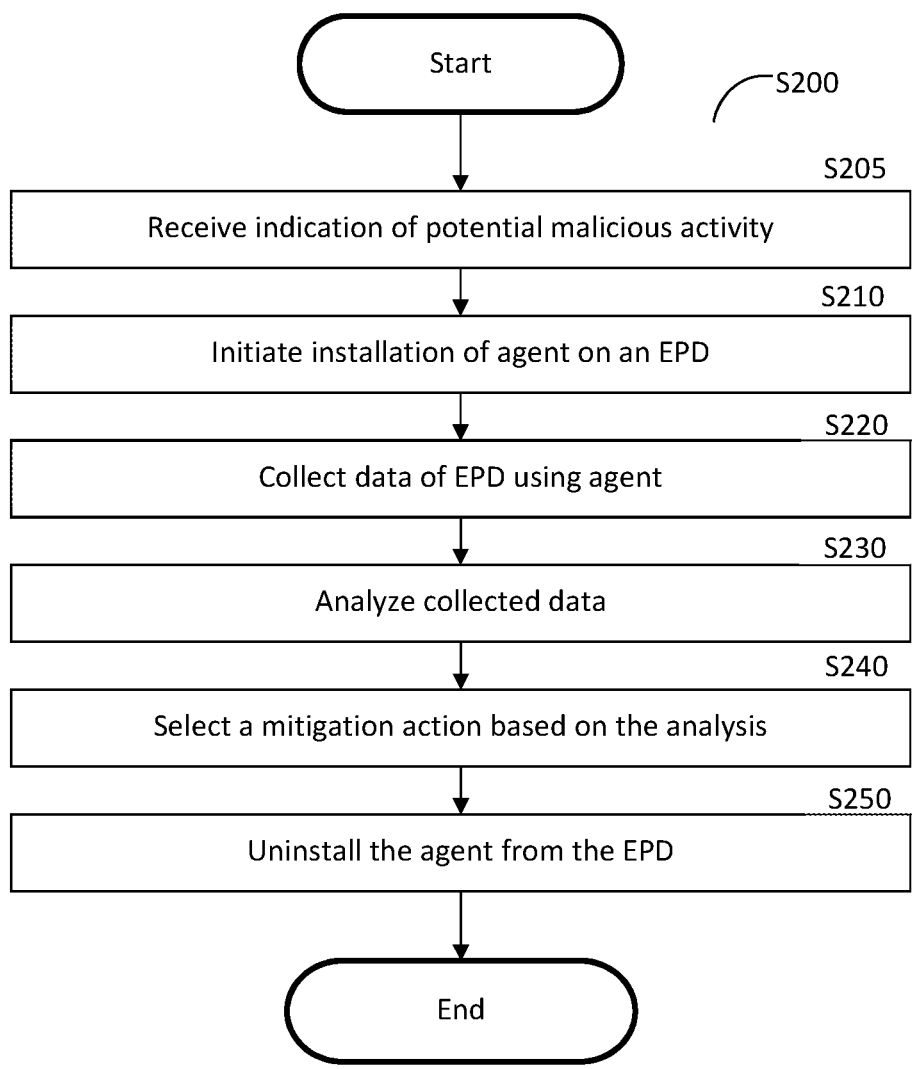
FIG. 2 is a flowchart describing a method for conducting a detailed computerized surveillance in a computerized environment according to an embodiment.

FIG. 2 is an example flowchart 200 illustrating a method for conducting a detailed computerized surveillance in a computerized environment, according to an embodiment.

At S205, an indication of a potential malicious activity executed on an EPD is received. The indication may be received from external security systems, such as, but not limited to, a security information and event management (SIEM) system, a cyber-attack detection system, and the like. Such systems may be already deployed in an organization. In an embodiment, an indication is received upon an attempt to activate a deceptive decoy element deployed in the organization.

At S210, an installation of an agent on an endpoint device (EPD) is initiated. The installation is performed in response to an indication of a potential malicious activity executed using the EPD. The agent is configured to collect data corresponding to one or more processes executed using the EPD 110, as further described herein above with respect to FIG. 1.

At S220, a collection of the data using the agent is activated on the EPD. As noted above, the agent is a software component configured to collect data related to one or more processes executed on the EPD. The collected data includes security logs, screenshots of the EPD's display, captured webcam images, recorded audio (via an EPD microphone), keyboard and mouse activity, process activity, driver events, CPU and memory usage, network protocols usage, file activity, and the like. Which data to collect is determined based on the detected potential malicious activity.

At S230, the collected data is received and analyzed. The analysis of the collected data is performed in order to determinate the threat level of the potential malicious activity detected on the EPD. The analysis may include, for example, comparing the collected data to a set of predetermined rules stored in a database. According to another embodiment, the determination of the threat level may be achieved using machine learning techniques utilized for identifying, for example, attempts to execute unauthorized processes, trends occurring in the computerized environment, and so on.

At S240, one or more mitigation actions are selected based on the analysis, that is, the determined threat level. The actions are executed by an agent, e.g., an agent residing on the EPD. The actions include, for example, killing processes, shutting down the EPD, restarting the EPD, logging the user off, locking the EPD, deleting Kerberos tickets, disabling drivers, disabling an internet connection, displaying messages, preventing files from being transferred/copied, and the like.

At S250, an uninstallation process of an agent on an endpoint device (EPD) is initiated. The agent may be uninstalled from the EPD when the mitigation action is completed, when a predefined time interval has elapsed, or based on a predetermined trigger. It should be noted that the EDP is always uninstalled at the conclusion of the executed method.

The embodiments disclosed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

What is claimed is:

1. A method for conducting a computerized surveillance in a computerized environment, comprising:
    initiating an installation of an agent on an endpoint device (EPD) in response to an indication of a potential malicious activity executed on the EPD;
    activating the agent to collect data on the EPD;
    based on the analysis of the collected data, selecting at least one mitigation action to be executed by the agent; and
    initiating an uninstallation of the agent from the EPD, wherein initiating the uninstallation of the agent is performed after a predefined time period from the installation of the agent.

2. The method of claim 1, wherein the indication is received in response to triggering of a deceptive decoy element deployed in the computerized environment.

3. The method of claim 1, wherein the indication is received from a security information and event management (SIEM) system.

4. The method of claim 1, wherein the indication is received from a third-party application.

5. The method of claim 1, wherein the collected data includes at least one of: security logs, screenshots of the EPD's display, captured webcam images, recorded audio, keyboard and mouse activity, process activity, driver events, central processing unit and memory usage, network protocols usage, and file activity.

6. The method of claim 1, further comprising:
    analyzing the collected data; and
    determining a threat level to the EPD.

7. The method of claim 6, further comprising:
    selecting the at least one mitigation action based on the determined threat level.

8. The method of claim 7, wherein the at least one mitigation action includes at least one of: killing processes, shutting down the EPD, restarting the EPD, logging a user off, locking the EDP, deleting a Kerberos ticket, disabling drivers, disabling an internet connection, and preventing files from being transferred.

9. A non-transitory computer readable medium having stored thereon instructions for causing a processing circuitry to execute a process for conducting a computerized surveillance in a computerized environment, the process comprising:
    initiating an installation of an agent on an endpoint device (EPD) in response to an indication of a potential malicious activity executed on the EPD;
    activating the agent to collect data on the EPD;
    based on the analysis of the collected data, selecting at least one mitigation action to be executed by the agent; and
    initiating an uninstallation of the agent from the EPD, wherein initiating the uninstallation of the agent is performed after a predefined time period from the installation of the agent.

10. A system for conducting a computerized surveillance in a computerized environment, comprising:
    an interface;
    a processing circuitry;
    a memory coupled to the processing circuitry, the memory containing instructions that, when executed by the processing circuitry, configure the system to:
    initiate an installation of an agent on an endpoint device (EPD) in response to an indication of a potential malicious activity executed on the EPD;
    activate the agent to collect data on the EPD;
    based on the analysis of the collected data, select at least one mitigation action to be executed by the agent; and
    initiate an uninstallation of the agent from the EPD, wherein initiating the uninstallation of the agent is performed after a predefined time period from the installation of the agent.

11. The system of claim 10, wherein the indication is received in response to triggering of a deceptive decoy element deployed in the computerized environment.

12. The system of claim 10, wherein the indication is received from a security information and event management (SIEM) system.

13. The system of claim 10, wherein the indication is received from a third-party application.

14. The system of claim 10, wherein the collected data includes at least one of: security logs, screenshots of the EPD's display, captured webcam images, recorded audio, keyboard and mouse activity, process activity, driver events, central processing unit and memory usage, network protocols usage, and file activity.

15. The system of claim 10, wherein the system is further configured to:
    analyze the collected data; and
    determine a threat level to the EPD.

16. The system of claim 15, wherein the system is further configured to:
    select the at least one mitigation action based on the determined threat level.

17. The system of claim 16, wherein the at least one mitigation action includes at least one of: killing processes, shutting down the EPD, restarting the EPD, logging a user off, locking the EDP, deleting a Kerberos ticket, disabling drivers, disabling an internet connection, and preventing files from being transferred.

* * * * *